United States Patent [19]

Guitaut et al.

[11] Patent Number: 4,754,686
[45] Date of Patent: Jul. 5, 1988

[54] DEVICE FOR RETAINING OR RELEASING A WIRE FOR ARMING A PROJECTILE FUSE

[75] Inventors: Philippe P. Guitaut, Brunoy; Pierre F. Coutin, Paris, both of France

[73] Assignee: R. Alkan & Cie, France

[21] Appl. No.: 82,751

[22] Filed: Aug. 7, 1987

[30] Foreign Application Priority Data

Aug. 8, 1986 [FR] France ................................. 86 11500

[51] Int. Cl.⁴ .............................................. F41F 5/02
[52] U.S. Cl. .................................... 89/1.55; 294/82.33
[58] Field of Search ...................... 89/1.55, 1.56, 1.51, 89/1.1; 294/82.31–82.35

[56] References Cited

U.S. PATENT DOCUMENTS

| 2,922,340 | 1/1960 | Wilkie | 89/1.55 |
| 3,807,784 | 4/1974 | Laky | 294/82.33 |
| 3,945,295 | 3/1976 | Robison | 89/1.55 |
| 3,998,124 | 12/1976 | Milhous et al. | 89/1.55 |
| 4,212,225 | 7/1980 | Correll et al. | 89/1.55 |
| 4,266,462 | 5/1981 | Carter et al. | 89/1.55 |
| 4,706,541 | 11/1987 | Coutin | 89/1.55 |

FOREIGN PATENT DOCUMENTS

| 1009263 | 5/1952 | France . |
| 2563490 | 10/1985 | France ................................. 89/1.55 |
| 1316513 | 5/1973 | United Kingdom . |

Primary Examiner—David H. Brown
Attorney, Agent, or Firm—William A. Drucker

[57] ABSTRACT

A device for retaining or releasing a wire for arming projectile fuses is provided, including a hook which retains the ring of the arming wire when the electromagnet acts, against the return action of a spring, through the mobile armature connected to the lever oscillating about the shaft. A catch pivoting about said shaft may engage by its end, a bearing face of said hook so as to maintain this latter in a position retaining said ring. A finger is carried by said lever and abuts against said catch, in the direction which frees this latter from the bearing face of the hook, when the lever is returned by said spring in the case of inaction of the electromagnet. A spring maintains the catch in contact with said finger.

7 Claims, 2 Drawing Sheets

DEVICE FOR RETAINING OR RELEASING A WIRE FOR ARMING A PROJECTILE FUSE

BACKGROUND OF THE INVENTION

The invention relates to releasing loads carried underneath aircraft and, more particularly, to the release of projectiles comprising firing fuses.

Some projectiles, and aviation bombs in particular, include firing fuses. The arming of these fuses is generally obtained by ripping away a safety wire, which ends in a ring retained by an auxiliary trip which completes the main device for releasing the bomb.

During release of the bomb, this auxiliary trip is required either to retain the ring in response to an electric command and thus to cause arming of the corresponding fuse, or to free the ring in the case of inert firing of the bomb. It must be possible, before releasing the bomb, to pass over from active firing to inert firing and conversely, without the ring being freed.

SUMMARY OF THE INVENTION

The device of the invention is of the type having a hook which ensures retention of the end ring of the wire for arming a load released by an associated carrying system in the case of actuation of an electromagnet and against the force of a return spring, on a mobile armature carried by a lever mounted for pivoting about a fixed pivot. It further includes a catch, mounted for pivoting about said fixed pivot and whose end may engage a bearing face of the hook so as to maintain this latter in the ring retention position, the finger carried by said lever and abutting against the catch in the direction which frees this latter from said bearing face of the hook when the lever is returned by the spring in the case of inaction of the electromagnet, and a second spring which acts on the catch for holding it engaged with said finger.

It will be understood that, if simultaneously with release of the load the electromagnet is energized, the action of the return spring acting on the lever is thwarted and this latter, as well as the catch which is held applied against the finger carried by the lever, hold the hook in the closed position thus ensuring retention of the ring and arming of the bomb fuse.

On the other hand, if the electromagnet is not energized during release of the charge, the return spring moves the lever while pushing back the catch through the finger. The catch then frees the bearing face of the hook which opens, thus freeing the ring for inert firing.

The device of the invention is designed for cooperation with a load carrying and release system which is associated therewith. For this, the device of the invention includes a cam fast on a shaft connected to the mechanism of the associated carrying system, and this cam is designed for pushing the lever actuating the catch and for maintaining it in its position which brings the armature back to the immediate vicinity of the electromagnet when the load to be released is in the transport position. The associated carrying system may in particular include a shaft whose rotation is determined by positioning of the load, such for example as in the release system described in French patent No. 83 19041 (published under the No. 2 555 543), and the cam support shaft of the device of the invention then extends the shaft of the associated transport system, with mutual rotational connection.

Depending on the conditions imposed by the user, the auxiliary trip, after cutting off the power supplying the electromagnet following an active release, must be able either to retain the ring or on the contrary to release it. The device of the present invention provides one and other of these two results by simply mounting, or not, an auxiliary stop and its return spring.

BRIEF DESCRIPTION OF THE DRAWINGS

For a better understanding of the device of the invention, a preferred embodiment thereof will be described hereafter by way of simple example without any limitative character, with reference to the accompanying drawings in which.

DESCRIPTION OF THE PREFERRED EMBODIMENT

Figure 1:
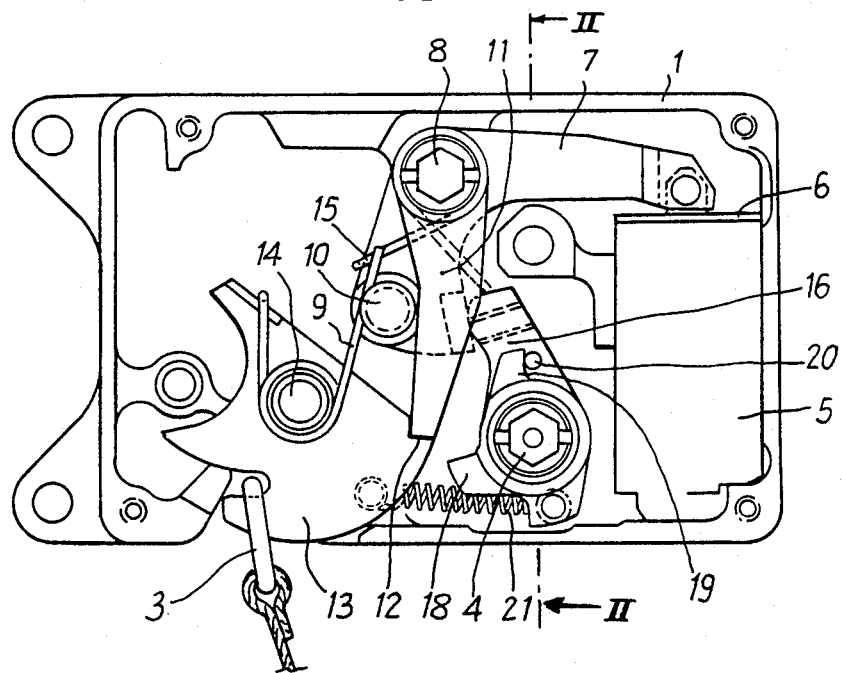
FIG. 1 shows the device of the invention in the standby position before release.

The device shown in the drawings is contained in a case 1 closed by a lid 2 and intended to be applied against a load release system, carried by an aircraft and not shown in the drawings which may be for example of the type described in French patent No. 83 19401 published under the No. 2 555 543. It may cooperate with a shaft of this release system, the rotation of which shaft is determined by the positioning of the load and manual operation of which causes, if required, engagement in the transport position of the hooks supporting the releasable load. This shaft is partially shown in FIG. 2 and is designated by the reference 30 (as in the drawing of French patent No. 83 19041).

A wire or flexible cable connected to the load ends in a ring 3 which is retained or not by the trip, depending on whether the load is to be fused or not.

Figure 2:
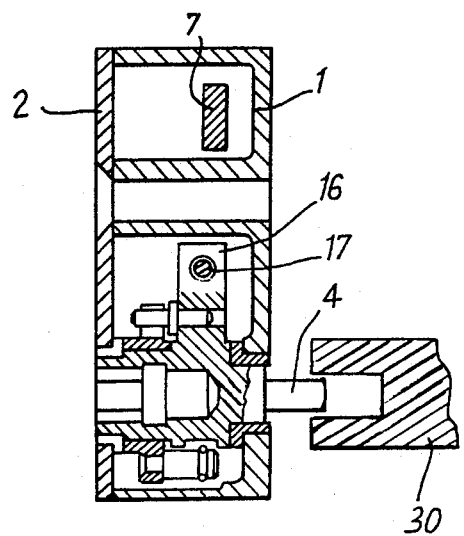
FIG. 2 is a vertical section taken through line II—II of FIG. 1.

The device includes a rotary extension shaft 4 a screwdriver shaped end of which engages in a screwdriver slot of shaft 30 (see FIG. 2). An electromagnet 5, fixed in case 1, has a mobile armature 6 carried by a crank lever 7 which pivots about a pin 8. Armature 6 is raised by a spring 9 bearing on lever 7, should there be an absence of electric current in the electromagnet 5 and in this case ring 3 will be freed when the load is released, in the way which will be described.

Finger 10 carried by the crank lever 7 acts against a catch 11 pivoting on the same pin 8 and whose end is able to engage a bearing face 12 of a hook 13 retaining the ring 3, this hook 13 pivoting about a pin 14 fixed in case 1.

Spring 9 bears by one end against finger 10, in the direction releasing of catch 11 from face 12 of the hook 13. The other end of spring 9 bears on hook 13 in the opening direction thereof and is in the direction releasing ring 3. A small spring 15 normally holds catch 11 engaged with finger 10. The force of spring 9 is such that in the absence of current flowing through the electromagnet 5, it raises armature 6 and releases catch 11 from hook 13, which frees ring 13 by opening this hook.

These actions are however made impossible as long as the load is in the carrying position, by means of a cam 16 integral with the extension shaft 4. This cam 16 in fact pushes back lever 7 and consequently prevents armature 6 from moving away from the electromagnet 5, whereas catch 11, since it is not urged by finger 10, remains engaged with hook 13 which remains closed thus retaining ring 3 (position as shown in FIG. 1).

The application of cam 16 on lever 7, which may depend on different clearances and in particular on that of the engagement between pins 4 and 30, may be adjusted by means of a screw 17 mounted in cam 16 (FIGS. 2 and 4) it is then the end of screw 17 which pushes lever 7 and not the cam 16 itself. It will be noted that cam 16 and the adjustment screws 17 have no direct action on catch 11, for their active ends are not in the same plane.

During release of the load, the extension shaft 4, driven by shaft 30, rotates in a clockwise direction looking at FIG. 1 and cam 16 (or screw 17) no longer retains lever 7.

In a first case (inert release), in the absence of electric current, the electromagnet 5 is not energized. Armature 6 then rises under the thrust of spring 9 on finger 10, which pushes back catch 11 against the action of spring 15, thus freeing this catch from hook 13 which opens (pivoting in an anticlockwise direction) under the action of the same spring 9. Ring 3 is released and the load is not fused (these positions are those shown in FIG. 3).

It will be noted that catch 11 is freed from hook 13 at the beginning of the movement of the extension shaft 4, so that ring 3 is released before the load itself.

In a second case of operation (active release), the electromagnet 5 is energized by an electric pulse simultaneous with that which controls the release of the load. In this case the electromagnet retains armature 6, despite the action of spring 9, while retaining hook 13 through lever 7 and catch 11 still applied against finger 10 by spring 15. With the load falling, hook 13 retains ring 3 and the cable whose pull arms the load (positions shown in FIG. 4). When, after release, the electric current is interrupted, ring 3 is then released as in the first case described above, the positions of the elements of the device then coming back to those shown in FIG. 3, the part referenced 18, not yet described, not rising in the above described version of the invention.

In both cases (inert release and active release) rearming of the load release system brings back armature 6 on the electromagnet 5 through the anticlockwise action of cam 16 on lever 7, whereas hook 13 remains open, its face 12 remaining disengaged from catch 11.

Figure 4:
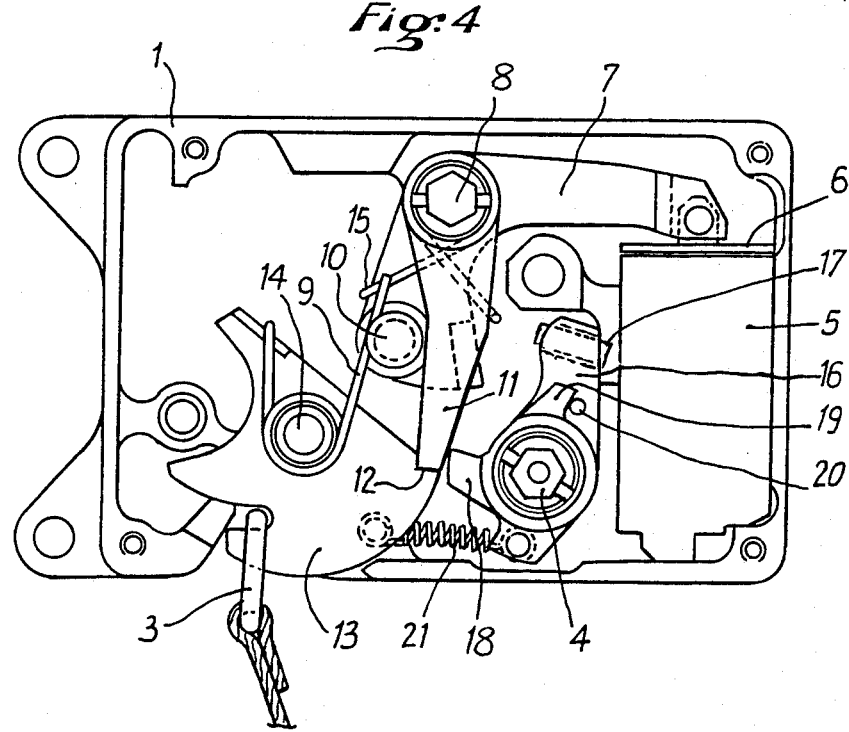
FIG. 4 is a view of the device in its position after an active release.

However some equipment requires that ring 3 remains held after release of the load. For such a result, the device in a completed version of a variant, further includes a stop 18 mounted for free rotation about the extension shaft 4. This stop 18 has an abutment nose 19 which comes into abutment against the projecting part 20 of shaft 4, under the action of a traction spring 21. Stop 18, coming almost into contact with catch 11, prevents this latter from releasing hook 13 so that ring 3 is retained even after interruption of the electric current after release of the load (FIG. 4).

During resetting of the release hook 13, on the other hand, for example at the time of positioning a new load, the extension shaft 4 comes back to the transport position by rotating in an anticlockwise direction. During this rotation stop 18 is driven by the projecting part 20 thus freeing catch 11 and so hook 13 which allows ring 3 to drop and a new ring to be positioned. After which, by pushing this latter, hook 13 may be closed thereon which catch 11, returned by spring 15, locks in a position retaining ring 3.

Figure 3:
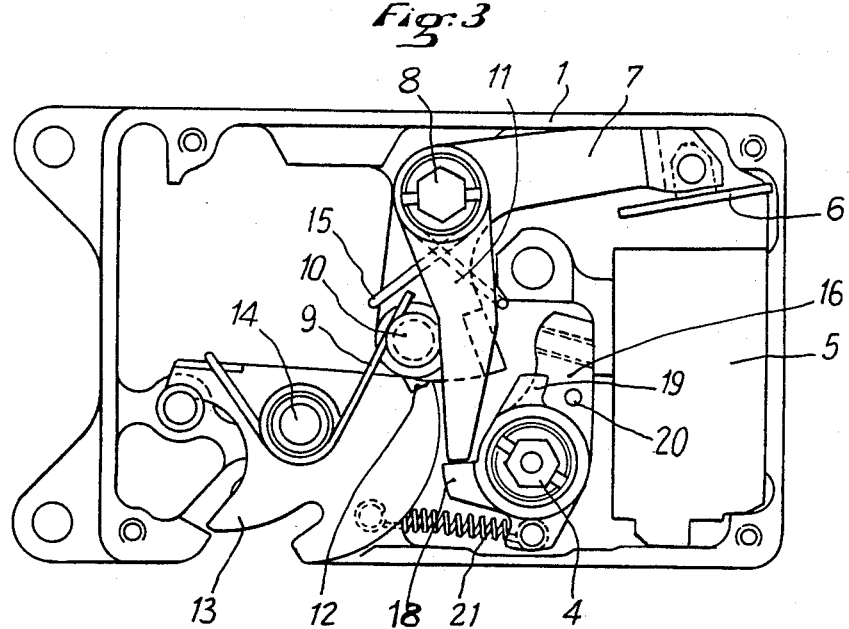
FIG. 3 is a view of the device in its position after an inert release.

If, with this same equipment retaining ring 3 after an active release, an inert release is desired as in the first mentioned case, stop 18 rotating in a clockwise direction engages with the end of catch 11 shortly after this latter has become disengaged from face 12 of hook 13 and it is then retained by this catch and its nose 19 is released from the projecting part 20 at the end of the movement of the extension shaft 4 (position shown in FIG. 3).

An improvement advantage provided by the invention is therefore that the fitting or not of stop 18 satisfies, with the same equipment, different specification of use.

Another advantage is its direct connection with a shaft such as 30 of a load release device, this being possible because shaft 4 is placed at the lower part of the device of the invention, which thus does not project below the release device and therefore does not interfere with the load itself.

It will be readily understood that the above description has been given simply by way of example, without any limitative character, and that constructional additions or modifications could be made thereto without departing from the scope and spirit of the invention defined by the following claims.

What is claimed is:

1. A device for retaining or releasing the end ring of a wire whose retention provides arming of a load released by an associated carrying system, including a hook retaining the ring in the case of actuation of an electromagnet on a mobile armature carried by a lever pivoting about a fixed shaft, while counteracting the force of a return spring, further including a catch pivoting about said shaft and the end of which may engage a bearing face of the hook for maintaining this hook in the position retaining the ring, by means of a finger carried by the lever and abutting against the catch in the direction which frees this latter from the bearing face of the hook when the lever is returned by the spring in the case of inaction of the electromagnet, and by means of a spring which tends to maintain the catch engaged with the finger.

2. The device as claimed in claim 1, wherein the return spring of said lever acts on said hook so as to cooperate in opening this latter for freeing the ring.

3. The device as claimed in claim 1, wherein said hook pivots about a shaft.

4. The device as claimed in claim 1, including a cam solid with a support shaft connected to a mechanism of said associated carrying system, the cam in load carrying position of said associated carrying system engaging the lever and holding same in a position where the armature is in an immediate vicinity of the electromagnet.

5. The device as claimed in claim 4, wherein the support shaft of said cam extends a shaft of the associated carrying system while being in mutual rotational connection.

6. The device as claimed in claim 4, including a stop coaxially mounted on said support shaft, this stop, when the cam is not in a position engaging the lever and the electro-magnet is out of action, engaging said catch and rotating same in abutment against said bearing face of the hook.

7. The device as claimed in claim 6, wherein said stop is mounted for free rotation about the support shaft of said cam and is held in a position retaining the catch by a spring, said stop having a nose which may be pushed back by a projecting part of said cam so as to put it out of action on the catch.

* * * * *